US008887445B2

(12) United States Patent
Patterson

(10) Patent No.: US 8,887,445 B2
(45) Date of Patent: Nov. 18, 2014

(54) DOOR GLASS OVER-CLOSING

(75) Inventor: Neil Patterson, Berkshire (GB)

(73) Assignee: McLaren Automotive Limited, Woking, Surrey (GB)

( * ) Notice: Subject to any disclaimer, the term of this patent is extended or adjusted under 35 U.S.C. 154(b) by 0 days.

(21) Appl. No.: 13/634,405

(22) PCT Filed: Mar. 17, 2011

(86) PCT No.: PCT/EP2011/054081
§ 371 (c)(1),
(2), (4) Date: Sep. 27, 2012

(87) PCT Pub. No.: WO2011/113911
PCT Pub. Date: Sep. 22, 2011

(65) Prior Publication Data

US 2013/0055642 A1 Mar. 7, 2013

(30) Foreign Application Priority Data

Mar. 17, 2010 (GB) .................................. 1004472.5

(51) Int. Cl.
*B60J 5/04* (2006.01)
*G03G 15/06* (2006.01)

(52) U.S. Cl.
CPC ..................................... *G03G 15/06* (2013.01)
USPC ................................. 49/502; 49/475; 49/131

(58) Field of Classification Search
USPC ........... 49/348, 349, 374, 372, 376, 440, 441, 49/502, 475.1, 477.1, 480.1, 404, 21, 31; 296/146.2, 146.3, 146.16
See application file for complete search history.

(56) References Cited

U.S. PATENT DOCUMENTS 4,730,414 A * 3/1988 Nakamura et al. .............. 49/348
4,835,449 A * 5/1989 Huehn .......................... 318/282
5,045,765 A * 9/1991 Wissler ......................... 318/382
5,489,104 A * 2/1996 Wolff ............................ 277/646
5,960,588 A * 10/1999 Wurm et al. .................... 49/352

(Continued)

FOREIGN PATENT DOCUMENTS

DE 4233267 A1 * 4/1994 ................. B60J 1/17
DE 19811362 A1 9/1999

(Continued)

OTHER PUBLICATIONS

"International Search Report", mailed Jul. 6, 2011, PCT/EP2011/054081.

*Primary Examiner* — Katherine Mitchell
*Assistant Examiner* — Shiref Mekhaeil
(74) *Attorney, Agent, or Firm* — Dergosits & Noah LLP

(57) ABSTRACT

A vehicle comprises an outer shell having an opening and a cover for the opening. The cover comprises: a housing, a window and a motor for moving the window. The motor management unit stores three predetermined positions of the window relative to the housing. When the housing is engaged with the opening: in the first predetermined position the window is resiliently retained within the seal and the cover can be released from the opening without damage to the cover; in the second predetermined position the window does not engage with the seal; and in the third predetermined position the window extends into the seal and the window is prevented from being released from the seal without the window first being retracted to the first or second positions. The motor management unit causes the motor to extend the window to the third predetermined position when the vehicle exceeds a predetermined speed.

19 Claims, 3 Drawing Sheets

(56) References Cited

U.S. PATENT DOCUMENTS

| | | | | | |
|---|---|---|---|---|---|
| 5,982,124 | A | * | 11/1999 | Wang | 318/466 |
| 6,260,906 | B1 | * | 7/2001 | Buchholz | 296/146.9 |
| 6,364,397 | B1 | * | 4/2002 | Bordeaux et al. | 296/146.2 |
| 6,729,683 | B2 | * | 5/2004 | Kreiner et al. | 296/223 |
| 7,362,068 | B2 | * | 4/2008 | Yamamoto | 318/469 |
| 7,980,621 | B2 | * | 7/2011 | Elliott et al. | 296/146.12 |
| 8,291,645 | B2 | * | 10/2012 | Hohn et al. | 49/506 |
| 2002/0108310 | A1 | * | 8/2002 | Schroer | 49/280 |
| 2005/0229497 | A1 | * | 10/2005 | Eichin | 49/506 |
| 2012/0136532 | A1 | * | 5/2012 | Konchan | 701/36 |

FOREIGN PATENT DOCUMENTS

| | | | | | |
|---|---|---|---|---|---|
| DE | 102006028050 | A1 | | 3/2007 | |
| DE | 102006028051 | A1 | | 12/2007 | |
| DE | 102007031409 | | * | 1/2009 | B60J 1/12 |
| JP | 57134321 | A | | 8/1982 | |

* cited by examiner

DOOR GLASS OVER-CLOSING

CROSS REFERENCE TO RELATED APPLICATIONS

This application is a U.S. National Phase of International Application No. PCT/EP2011/054081 filed on Mar. 17, 2011, which claims priority to and the benefit of United Kingdom Patent Application No. GB1004472.5 filed on Mar. 17, 2010, the entire contents of which are incorporated herein by reference.

BACKGROUND OF THE INVENTION

This invention relates to a system for retaining a frameless door within a vehicle body.

A typical vehicle includes multiple doors by which passengers can enter and leave the vehicle. Conventionally, vehicle doors include a glass window covering an opening that is bounded by a frame and a housing into which the glass window can be at least partially retracted. In its fully extended position the glass window engages with the frame and covers the opening in the door. Typically the frame will have a seal which stops the ingress of water into the car and shuts out wind noise generated by the motion of the vehicle.

In an alternative configuration found in some modern vehicles, the vehicle door does not feature a frame surrounding the glass window and the glass window is therefore not supported along much of its edge. The seal for the glass window that was provided by the frame of the door is now provided at the vehicle body. In some vehicles, when a frameless door is closed the edge of the window rests against a seal on the vehicle body. The mechanism of the door can be arranged such that the window is pushed into the seal when the door is closed. However such an arrangement does not securely hold the window in place and cannot be safely used in vehicles with a very high top speed which can generate significant differences in pressures between the inside and outside of the vehicle.

A better solution for a frameless door is to arrange for the top edge of the window to fit inside a seal around the door opening in the car body, in analogous fashion to a window in a door with a frame. However, in order to achieve this the window must be retracted slightly into its housing whenever the door is opened so that the top edge of the window is pulled out of the seal prior to the door being opened. When the door is shut the window is pushed into the seal such that its top edge is contained inside the seal. This window movement is generally linked to the door release mechanism, so that the window immediately slides down in response to the user engaging the door release mechanism.

In order to allow such frameless doors to be released in the event of a failure of the vehicle electrics (and hence the window motor), the door must be openable without the window being lowered slightly to release the window from the seal. This ensures that occupants are not trapped inside the vehicle in the event of a crash. Such cars therefore need to have a seal at the top of the window which resists the ingress of water and wind noise into the cabin but which is flexible enough to allow the top edge of the window to be forced out of the seal. However, such a door arrangement is often not strong enough to securely retain the window glass in a vehicle travelling at high speeds, such as can occur in a high performance sports car. At high speeds the air flow over the outside of the car causes a significant pressure difference between the inside and outside of the car, sucking the door windows outwards and potentially out of their seals. Nevertheless, frameless door designs can be aesthetically desirable, particularly in sports cars.

There is therefore a need for an improved frameless door arrangement suitable for a vehicle capable of travelling at high speeds.

SUMMARY OF THE INVENTION

According to the present invention there is provided a vehicle comprising: an outer shell having an opening at least partly bounded by a seal; and a cover for an opening in the outer shell, the cover comprising a housing, a window piece slideably engaged with the housing and a motor operable to retract and extend the window piece under the control of a motor management unit; wherein the housing is adapted to be releasably engaged with the opening and the motor management unit is configured to store three predetermined positions of the window piece relative to the housing such that, when the housing is engaged with the opening: in the first predetermined position the window piece is resiliently retained within the seal along at least part of its edge in such a way that the cover can be released from the opening without damage to the cover whilst the window piece is in the first predetermined position; in the second predetermined position the window piece does not engage with the seal; and in the third predetermined position the window piece extends into the seal such that the window piece is prevented from being released from the seal without the window piece first being retracted to the first or second positions; wherein the motor management unit is configured to cause the motor to extend the window piece to the third predetermined position when the vehicle exceeds a predetermined speed.

Preferably the distal edge of the window piece from the housing lies within the seal in the first and third predetermined positions.

Preferably, below the predetermined speed the extension of the window piece relative to the housing is held at an extension equal to or less than the first predetermined position.

Preferably the cover further comprises a locking mechanism for securing the cover over the opening and the motor is configured to, if the window piece is not at or below the second predetermined position, retract the window piece to the second predetermined position when the locking mechanism is disengaged so as to release the cover from the opening.

Preferably the cover is released from the opening the extension of the window piece relative to the housing is held at an extension equal to or less than the second predetermined position.

Preferably the seal is configured such that the cover can be released from the opening without deformation to the cover whilst the window piece is in the first predetermined position.

Suitably the window piece is a glass sheet or a polycarbonate sheet.

Preferably the cover is coupled to the outer shell by one or more hinges. Preferably the one or more hinges are configured such that, on opening, the door has a component of rotation about an axis substantially perpendicular to the plane generally defined by the window glass.

Preferably, when the window piece is in the first predetermined position and the housing is engaged with the opening, at least part of an outer edge of the seal overlaps said edge of the window piece. Preferably the outer edge of the seal is a flexible skirt.

Preferably, when the window piece is in the third predetermined position and the housing is engaged with the opening, said edge of the window piece snugly engages with a compliant surface of the seal so as to significantly damp vibrations of that edge relative to the outer shell of the vehicle.

Preferably, when the window piece is in the third predetermined position and the housing is engaged with the opening, said edge of the window piece is retained by a structural member of the outer shell of the vehicle.

Preferably the motor management unit is part of a general electronic management system of the vehicle.

The vehicle may be an automobile.

DESCRIPTION OF THE DRAWINGS

The present invention will now be described by way of example with reference to the accompanying drawings, in which.

DETAILED DESCRIPTION OF THE DRAWINGS

Figure 1:
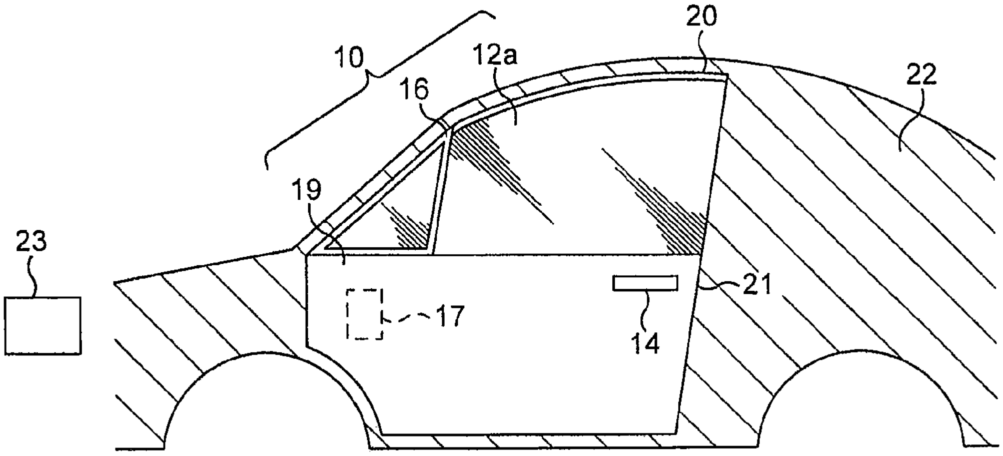
FIG. 1 is a side view of a car showing a car door with a window in the closed position.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a frameless cover arrangement for an opening in the outer shell of a vehicle body. The invention is of particular relevance to automobiles having a high maximum speed. The cover could be any cover which leave the vehicle. A frameless window is one which is not held at all its edges by the cover when the window is fully extended. The cover may be connected to the vehicle by means of any mechanism configured such that, on releasing the cover from the opening, the cover moves by one or both of rotation and translation out of the plane generally defined by the cover when the cover is connected over the opening.

In the following examples, a windowed frameless cover configured in accordance with the present invention will be described in relation to an automobile (car) door.

FIGS. 1 to 4 illustrate a car door 10 comprising a housing 19, a window 12, the door being adapted to snugly mate with an opening 21 (that region which is not shaded in FIG. 1 and which is covered by cover 10) in the body of the car. The door can optionally include a door lever or button 14 (or an electronic receiver for receiving an open or close command from a remote control device) connected to a locking mechanism in the housing which is operable to secure the door over the opening. The door 10 can also optionally include a front pillar 16 which can include a channel for supporting a front edge of the window 12 and along which the window can slide. The channel thus provides a guide for window 12 when it moves from a closed position 12*a* to an open position 12*d*.

The car 22 includes a seal 20 having one or more parts connected around the opening so as to engage with an edge of the window. The seal is preferably located so as to engage along at least part of the length of the distal edge 25 of the window (i.e. that edge which is not supported by the housing 10), and preferably along its entire length.

The car door 10 is attached to car 22 by a hinged arrangement (not shown) which could be located at any peripheral part of the car door. Typically a car door hinge allows the door to move out of the opening in which the door is operable to engage in a snug fit by a combination of rotation and translation relative to the car. The axis of rotation of the door about the hinge is typically substantially parallel to the general plane defined by the door when the door is closed over the opening in the car. However, in unconventional door opening actions, the hinged arrangement can have a component of rotation about an axis substantially perpendicular to the plane generally defined by the window glass. The present invention is of particular application to car doors having such unconventional door opening actions because the direction of movement of the window glass as the door opens has a component upwards into that part of the seal which is securely supported by the outer shell of the car.

Figure 3:
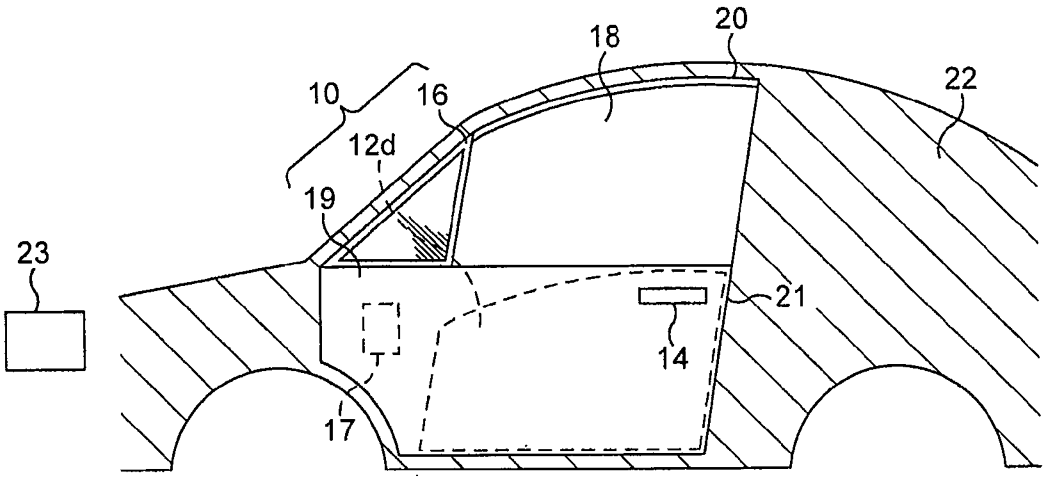
FIG. 3 is a side view of the car showing the car door with the window in the fully open position.

The window 12 is operable to move from a closed position 12*a* to an open position 12*d*, shown in FIG. 3. In the open position the window may be fully or partially held with housing 19. The window 12 is driven between these positions by a motor 17, which is typically contained within the door housing 19. The window is also capable of moving to an over-closed position 12*c* where the window 12 is driven up into seal 20 above the upper edge of the door, as shown by line 24 in FIG. 4. The window extends further out of housing 19 in over-closed position 12*c* than in closed position 12*a*.

Figure 5:
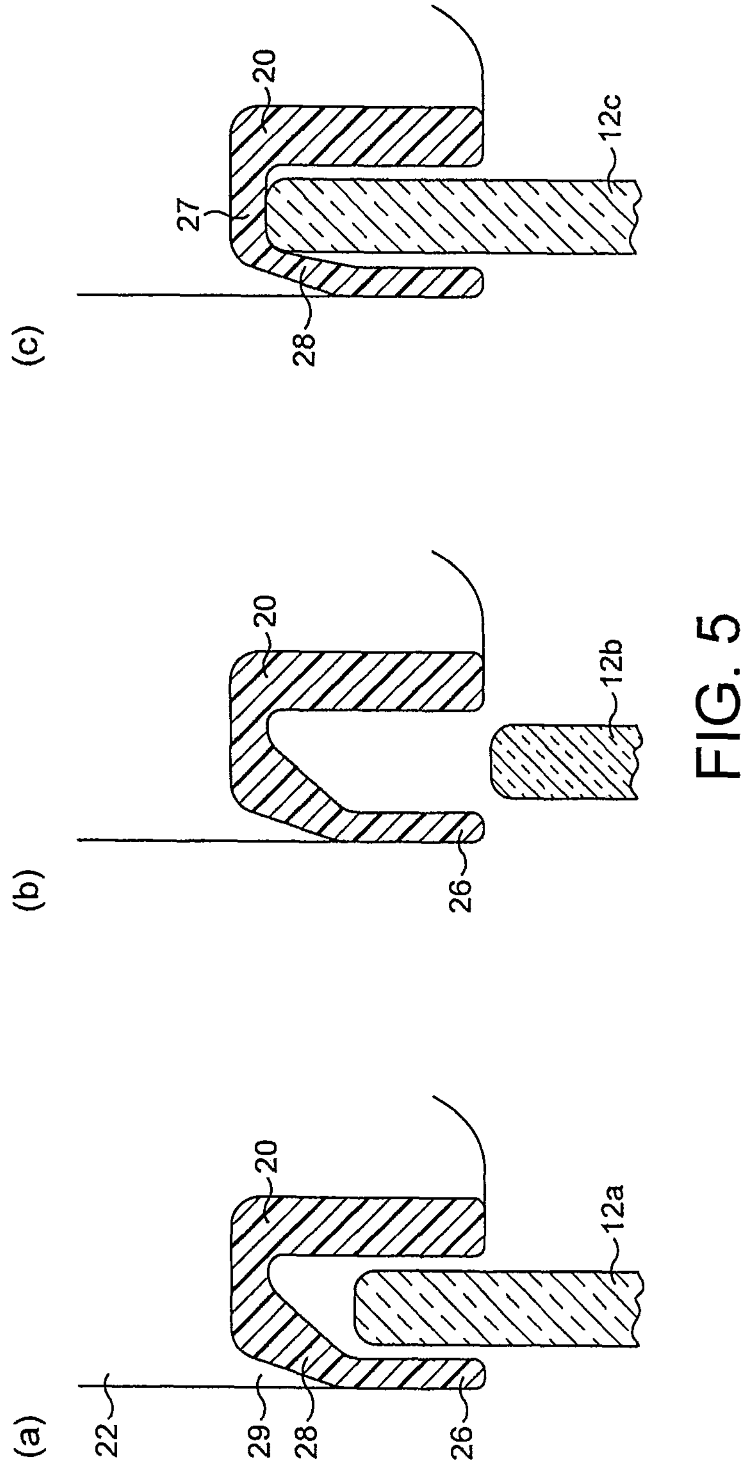
FIG. 5 is a schematic view of the window in the closed, door opening position and over-closed positions.

FIG. 5*a* shows a cut-through view of the window 12 in the closed position 12*a* of FIG. 1, in which the distal edge of the window is engaged with seal 20. Preferably a flexible skirt 26 of the seal sits outward of the distal edge of the window which seals the window against water and wind noise but which allows the door to be pushed open by a passenger inside the car in an emergency. The outer portion of the seal 26 is configured to allow the window to displace that part of the seal when the window is in position 12*a* and the door is forced open in a direction substantially perpendicular to the plane generally defined by the window.

Figure 2:
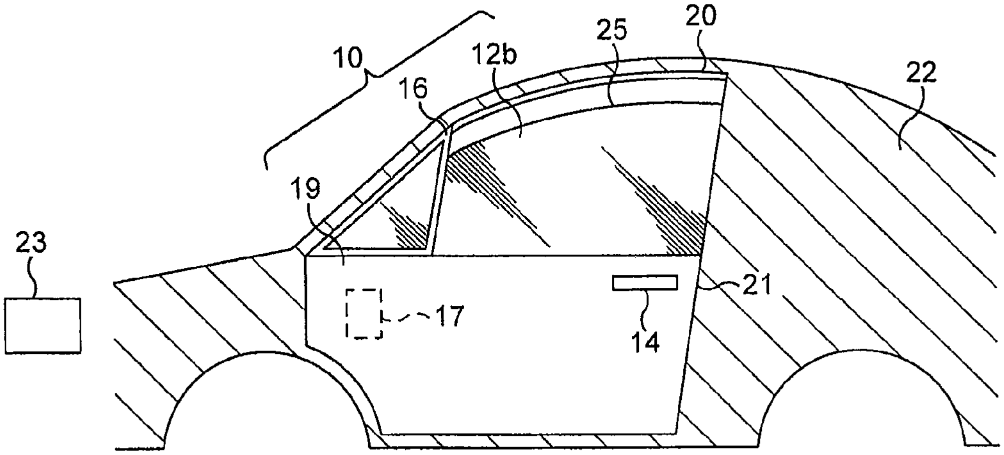
FIG. 2 is a side view of the car showing the car door with the window in the door opening position.

FIG. 5*b* shows a cut-through view of the window 12 in partially open position 12*b* of FIG. 2. This is the position that the window adopts so as to allow the door to open, if the window is not already in an open position. This window is preferably configured to drop in response to door lever or button 14 (or equivalent interior means for opening the door) being engaged by the user, as is known in the art. In this position, the distal edge of the window 12 is retracted sufficiently far from seal 20 to allow the door to be easily opened, preferably without brushing the seal.

Figure 4:
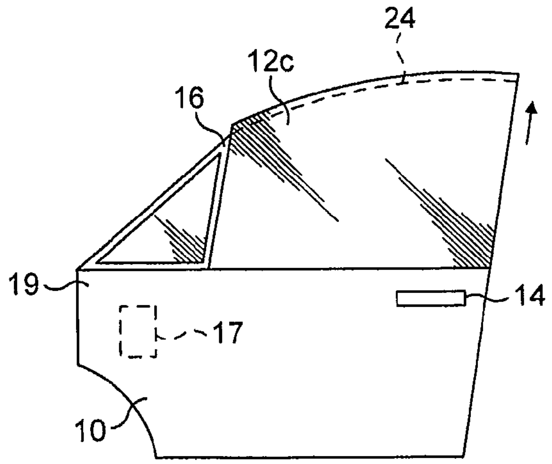
FIG. 4 is a side view of the car showing the car door with the window in the over-closed position.

FIG. 5*c* shows a cut-through view of the window 12 in the over-closed position 12*c* of FIG. 4 with the distal edge of the window being fully engaged with seal 20. The top edge of the window 12 is now located above the level of the flexible part of the seal 20. Therefore the window 12 is now secured in the seal 20 and is prevented from being forced out of the seal by region 28 of the seal which could be of relatively higher stiffness but is preferably bounded by a structural member 29 of the car 22. Most preferably the window edge snugly engages with a compliant surface 27 of the seal so as to significantly damp vibration of that edge relative to the outer shell of the vehicle.

The car includes a motor management unit 23, which could be situated in door housing 19 or at any other point in the car. The motor management unit could be part of a general electronic management system for the car. Motor management unit 23 is configured to control the motor 17 so as to extend or retract the window glass 12, possibly in response to commands received from a passenger of the vehicle. The motor management unit is operable to store three predetermined positions for the window: the window positions 12*a*, 12*b* and 12*c* described above.

As is known in the art, the motor management unit is configured to, when a door opening control (such as door handle 14) is engaged by a user so as to open the door, drop the window glass to position 12*b* so that the edge of the glass is not engaged with the seal, allowing the door to be opened without excessive force being applied by the user. In accordance with the teachings herein, the motor management unit is further configured to cause the motor to extend the window to over-closed position 12*c* when the vehicle exceeds a predetermined speed, which could be 150 mph, 180 mph or 200 mph. At speeds below the predetermined speed, the motor management unit is configured to hold the window in the normal closed position 12*a*, unless the user has retracted the window to a partially open position below position 12*a*. If the window position is below 12*a* when the vehicle exceeds the predetermined speed, the motor management unit is configured to extend the window to over-closed position 12*c*. But alternatively, the motor management unit could be configured to only extend the window to over-closed position 12*c* if the window is in closed position 12*a*.

By moving the window into an over-closed position the distal edge of the window is securely held against the pressure differences which can act across a window at high speed.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A vehicle comprising:

an outer shell having an opening at least partly bounded by a seal;

a cover for the opening in the outer shell, the cover comprising a housing, a window piece slideably engaged with the housing and a motor operable to retract and extend the window piece under the control of a motor management unit;

wherein the seal comprises: a lower outer edge; and an upper region that is of higher stiffness than the lower outer edge and asymmetrically shaped in a plane substantially perpendicular to a plane generally defined by the window piece;

wherein the housing is adapted to be releasably engaged with the opening;

wherein the motor management unit is configured to store three predetermined positions of the window piece relative to the housing such that, when the housing is engaged with the opening:

in the first predetermined position the window piece is resiliently retained within the seal along at least part of an edge of the window piece in such a way that the cover can be released from the opening without damage to the cover whilst the window piece is in the first predetermined position, and at least part of the lower outer edge of the seal overlaps said edge of the window piece;

in the second predetermined position the window piece does not engage with the seal; and in the third predetermined position the window piece extends into the seal such that the window piece is prevented from being released from the seal by the asymmetrically shaped upper region without the window piece first being retracted to the first or second positions; and wherein the motor management unit is configured to cause the motor to extend the window piece to the third predetermined position when the vehicle exceeds a predetermined speed.

2. A vehicle as claimed in claim 1, wherein a distal edge of the window piece from the housing lies within the seal in the first and third predetermined positions.

3. A vehicle as claimed in claim 2, wherein below the predetermined speed the extension of the window piece relative to the housing is held at an extension equal to or less than the first predetermined position.

4. A vehicle as claimed in claim 2, wherein, when the window piece is in the third predetermined position and the housing is engaged with the opening, said edge of the window piece snugly engages with a compliant surface of the seal so as to significantly damp vibrations of that edge relative to the outer shell of the vehicle.

5. A vehicle as claimed in claim 2, wherein, when the window piece is in the third predetermined position and the housing is engaged with the opening, said edge of the window piece is retained by a structural member of the outer shell of the vehicle.

6. A vehicle as claimed in claim 1, wherein below the predetermined speed the extension of the window piece relative to the housing is held at an extension equal to or less than the first predetermined position.

7. A vehicle as claimed in claim 1, wherein the cover further comprises a locking mechanism for securing the cover over the opening and the motor is configured to, if the window piece is not at or below the second predetermined position, retract the window piece to the second predetermined position when the locking mechanism is disengaged so as to release the cover from the opening.

8. A vehicle as claimed in claim 7, wherein when the cover is released from the opening the extension of the window piece relative to the housing is held at an extension equal to or less than the second predetermined position.

9. A vehicle as claimed in claim 1, wherein the seal is configured such that the cover can be released from the opening without deformation to the cover whilst the window piece is in the first predetermined position.

10. A vehicle as claimed in claim 1, wherein the window piece is a glass sheet or a polycarbonate sheet.

11. A vehicle as claimed in claim 1, wherein the cover is coupled to the outer shell by one or more hinges.

12. A vehicle as claimed in claim 11, wherein the one or more hinges are configured such that, on opening, the cover has a component of rotation about an axis substantially perpendicular to the plane generally defined by the window piece.

13. A vehicle as claimed in claim 1, wherein, when the window piece is in the first predetermined position and the housing is engaged with the opening, at least part of an outer edge of the seal overlaps said edge of the window piece.

14. A vehicle as claimed in claim 13, wherein the outer edge of the seal is configured to allow the window to displace that part of the seal when the window is in the first position and the door is forced open in a direction substantially perpendicular to the plane generally defined by the window.

15. A vehicle as claimed in claim 1, wherein, when the window piece is in the third predetermined position and the housing is engaged with the opening, said edge of the window piece snugly engages with a compliant surface of the seal so as to significantly damp vibrations of that edge relative to the outer shell of the vehicle.

16. A vehicle as claimed in claim 15, the outer shell having a structural member, and wherein, when the window piece is in the third predetermined position and the housing is engaged with the opening, said edge of the window piece is retained by the structural member of the outer shell of the vehicle.

17. A vehicle as claimed in claim 1, wherein the motor management unit is part of a general electronic management system of the vehicle.

18. A vehicle as claimed in claim 1, wherein the cover is a door of an automobile.

19. A vehicle as claimed in claim 1, the outer shell having a structural member; and wherein, when the window piece is in the third predetermined position and the housing is engaged with the opening, said edge of the window piece is retained by the structural member of the outer shell of the vehicle.

* * * * *